(12) United States Patent
Aksyuk et al.

(10) Patent No.: US 6,690,885 B1
(45) Date of Patent: Feb. 10, 2004

(54) OPTICAL CROSSCONNECT USING TILTING MIRROR MEMS ARRAY

(75) Inventors: Vladmir Anatolyevich Aksyuk, Piscataway, NJ (US); David John Bishop, Summit, NJ (US); Randy Clinton Giles, Whippany, NJ (US)

(73) Assignees: Lucent Technologies Inc., Murray Hill, NJ (US); Agere Systems, Inc., Allentown, PA (US)

( * ) Notice: Subject to any disclaimer, the term of this patent is extended or adjusted under 35 U.S.C. 154(b) by 0 days.

(21) Appl. No.: 09/512,174

(22) Filed: Feb. 24, 2000

Related U.S. Application Data

(60) Provisional application No. 60/166,149, filed on Nov. 17, 1999, and provisional application No. 60/158,283, filed on Oct. 7, 1999.

(51) Int. Cl.[7] .......................... H04J 14/00; H04J 14/02; G02B 6/26; G02B 6/32; G02B 6/06
(52) U.S. Cl. .............................. 398/45; 398/49; 398/50; 398/56; 398/82; 398/88; 385/16; 385/17; 385/18; 385/33; 385/119
(58) Field of Search ................................. 359/117, 128, 359/139; 385/16, 17, 18, 19, 33, 119; 398/45, 49, 51, 88, 82, 50

(56) References Cited

U.S. PATENT DOCUMENTS

| | | | |
|---|---|---|---|
| 5,037,173 A | 8/1991 | Sampsell et al. | 385/17 |
| 6,466,711 B1 * | 10/2002 | Laor et al. | 385/18 |

FOREIGN PATENT DOCUMENTS

| | | | |
|---|---|---|---|
| JP | 05-107485 | * 10/1991 | G02B/26/08 |
| JP | 05107485 | 4/1993 | |

OTHER PUBLICATIONS

L.Y. Lin, Free–Space Micromachined Optical Switches with Submillisecond Switching Time for Large–Scale Optical Crossconnect, Apr. 4, 1998, XP–000754214.

\* cited by examiner

*Primary Examiner*—Leslie Pascal
*Assistant Examiner*—M. R. Sedighian
(74) *Attorney, Agent, or Firm*—Cohen, Pontani, Lieberman & Pavane

(57) ABSTRACT

An optical crossconnect constructed of micro-electromechanical systems (MEMS) tilt mirror arrays for selectively routing optical signals to optic fibers. The crossconnect includes a lens array for directing optical signals from a fiber array to the MEMS mirror array. Individual mirror elements in the mirror array reflect the optic signals to additional optic elements such as a planar mirror, a transmissive/reflective optical element or a second MEMS mirror array for routing the optical signals to output optic fibers.

7 Claims, 5 Drawing Sheets

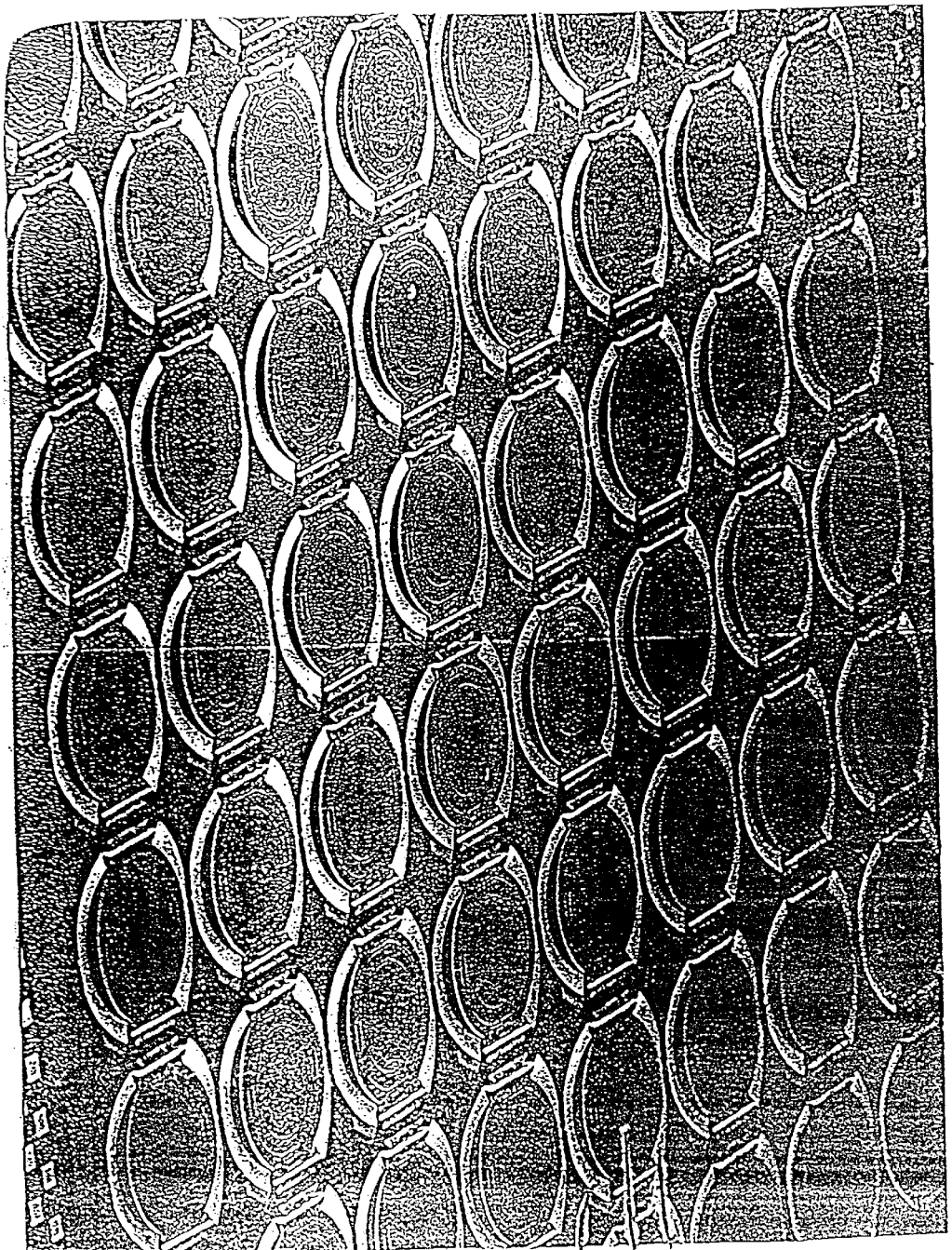

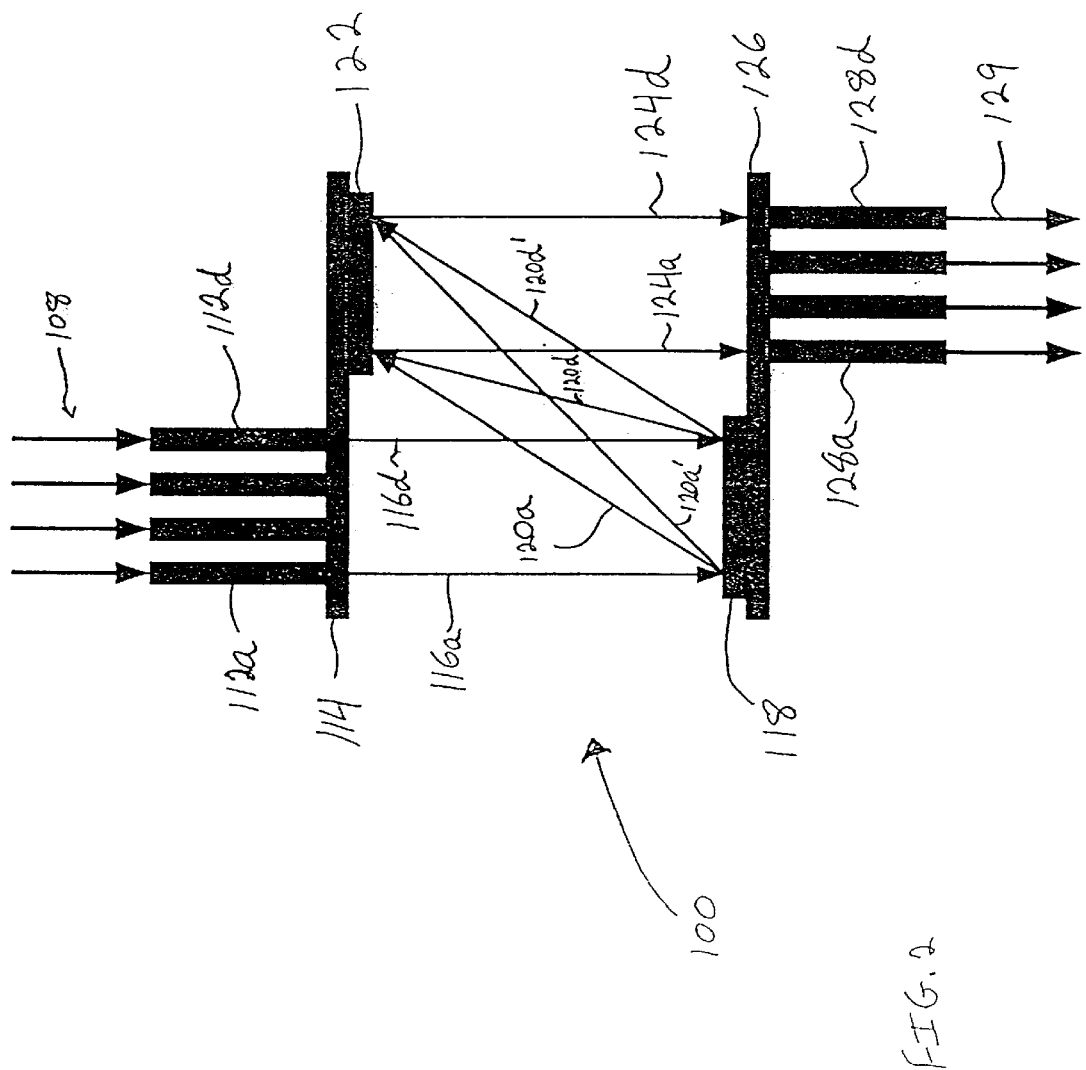

OPTICAL CROSSCONNECT USING TILTING MIRROR MEMS ARRAY

This application is based on U.S. Provisional Application Ser. No. 60/166,149 filed on Nov. 17, 1999 and U.S. Provisional Application Ser. No. 60/158,283 filed on Oct. 7, 1999.

BACKGROUND OF THE INVENTION

1. Field of the Invention

The present invention pertains to fiber optic communications systems and, more particularly, to optical crossconnect configurations utilizing micro electromechanical systems (MEMS) tilting mirror arrays.

2. Description of the Related Art

In fiber optic communication systems, signal routing is essential for directing an optical signal carrying data to an intended location. Existing routing techniques typically experience optical power loss due to inefficient coupling of optic signals between input and output fibers. This increases the dependence on optical power sources (e.g., pump lasers) which are used to compensate for power losses by injecting optical power back into the optical system. The need for optical power sources increases the overall cost of the optical system.

Another criteria for signal routing is the ability to direct a signal received from one of a plurality of input fibers or ports to any of a plurality of output fibers or ports without regard to the frequency of the optical signal. Known optical signal routers are frequency dependent so that frequency dictates the routing of multiple signals, each signal having a discrete wavelength, to output ports based on the signal frequency. For example, and as disclosed in commonly-owned U.S. patent application Ser. No. 09/414,622, filed Oct. 8, 1999, multiple adjacent-in-frequency wavelengths will be routed to adjacent-in-space output fibers, as opposed to randomly selected output fibers. Accordingly, an optical crossconnect system is desired having flexible frequency routing capability with reduced power loss.

SUMMARY OF THE INVENTION

Improvements over known optical crossconnects are realized by providing an optical crosssconnect utilizing an array of tilting micro-electromechanical systems (MEMS) mirrors for directing optical signals from input optic fibers to output optic fibers. The optical crossconnect includes a lens array for receiving optical signals from a plurality of input fibers. The lens array is made of up a plurality of lens elements, with each lens element directing or focussing an optical signal to a MEMS mirror array. The MEMS mirror array includes a plurality of mirror elements, each being tiltable about one or more rotational axes upon the application of control signals to the desired mirror elements. In this manner, optical signals can be directed along various paths and to various output fibers.

In a preferred embodiment, input and output lens arrays are used in conjunction with input and output MEMS mirror arrays. The input lenses direct input optical signals to the input MEMS array which, in turn, reflects each signal in a direction relative to each mirror's tilt orientation. The reflected signals are received and further reflected by the output MEMS mirror array to the output lens array for coupling to output fibers.

In another preferred embodiment, input and output lens arrays are formed on a common substrate, with a reflective surface disposed therebetween, and input and output MEMS mirror arrays are formed on a second common substrate disposed in opposing relation to the first substrate. The reflective surface receives reflected optical signals from the input MEMS array and directs them to the output MEMS array.

In yet another embodiment, an optical element having transmissive properties is disposed in optical communication with a first MEMS mirror array and a second MEMS mirror array. The optical element directs optical signals, either by transmission or reflection, between the first and second mirror arrays to selectively forward optical signals between a first fiber array and a second fiber array.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals denote similar elements throughout the several views.

FIG. 1 is a planar view of an example of a MEMS mirror array used in connection with the present invention;

FIG. 2 is a schematic representation of an optical crossconnect in accordance with one embodiment of the present invention;

DETAILED DESCRIPTION OF THE PRESENTLY PREFERRED EMBODIMENTS

Figure 3:
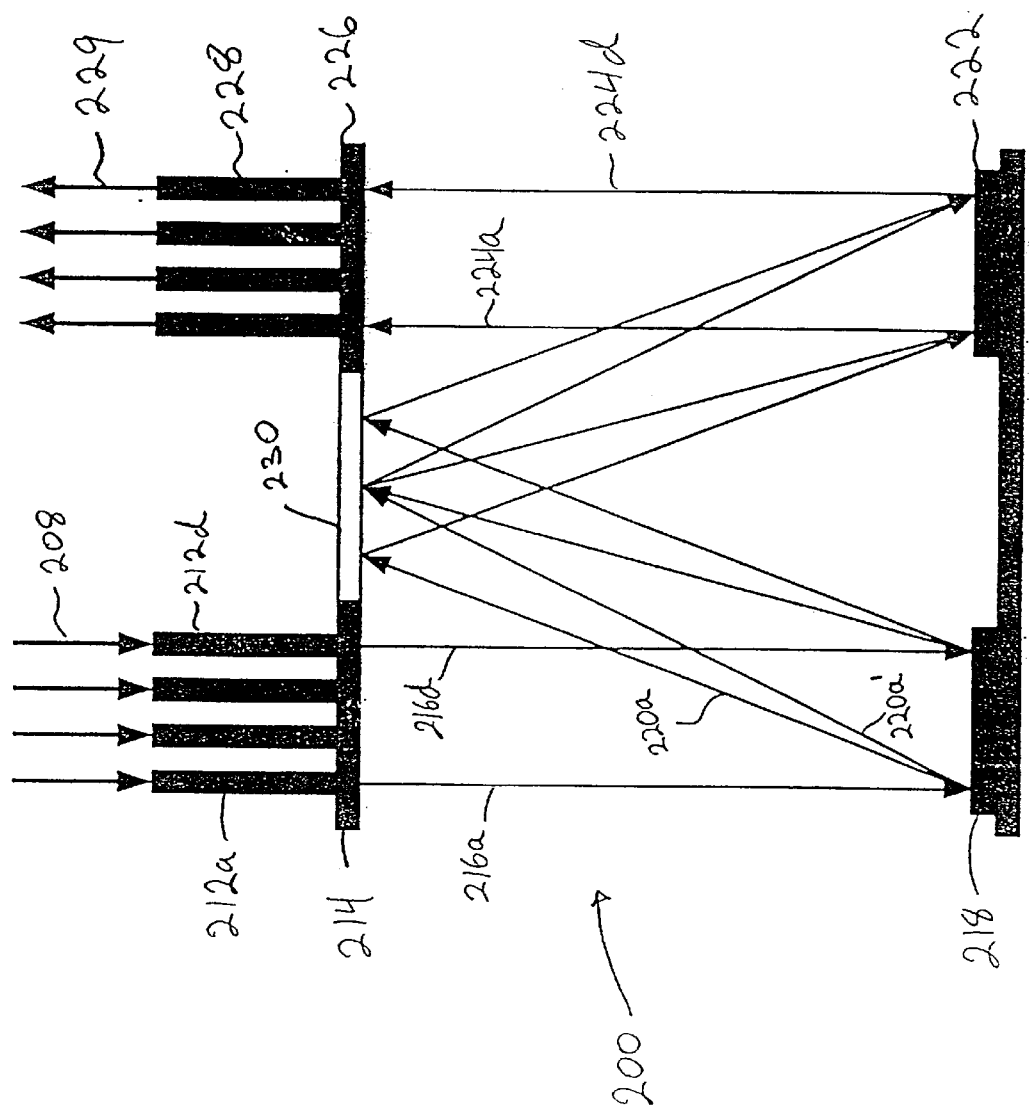
FIG. 3 is a schematic representation of an alternative embodiment of the optical crossconnect of FIG. 2.

Arrays of two-axis tilt mirrors implemented using micro-electromechanical systems (MEMS) technology allow for the construction of large scale optical crossconnects for use in optical systems. Optical crossconnects are employed to connect a number of input optical paths to a number of output optical paths. Typical requirements of optical crossconnects are that any input be capable of being connected to any output. One example of a MEMS mirror array 10 is depicted in FIG. 1. The mirror array 10 includes a plurality of tilt mirrors 12 mounted to actuation members or springs 14 and controlled by electrodes (not shown). Each mirror 12 is approximately 100–500 Microns across, may be shaped as square, circular or elliptical, and is capable of rotating or tilting about X–Y axes, with the tilt angle being determined by the amount of voltage applied to the electrodes. Further details of the operation of the MEMS mirror array 10 is found in U.S. patent application Ser. No. 09/415,178, filed Oct. 8, 1999, the entire contents of which are incorporated herein by reference. The general concept of utilizing two or more such tilt mirror arrays 10 to form an optical crossconnect is disclosed in U.S. patent application Ser. No. 09/410,586, filed Oct. 1, 1999, the entire contents of which are also incorporated herein by reference.

Applicants have discovered that by utilizing one or more MEMS tilt mirror arrays in conjunction with a lens array, various optical crossconnect configurations can be realized of compact size (i.e. minimal spacing between crossconnect components) and exhibiting minimal optical power loss. One such optical crossconnect 100 in accordance with a currently preferred embodiment of the invention is depicted in FIG. 2. Crossconnect 100 receives input optic signals 108 through a plurality of optic fibers 112, preferably formed in an array as is well known in the art. For ease of illustration fiber array 112 is shown as a one-dimensional array having four fibers 112a, 112b, 112c, 112d. It is in any event to be understood that fiber array 112 as well as other fiber arrays discussed herein are preferably two-dimensional N×N arrays.

Fiber array 112 transmits the optical signals 108 to an array of lenses 114 preferably functioning as collimating lenses. The lens array 114 is positioned relative to the fiber array 112 so that each lens communicates with a corresponding fiber for producing pencil beams 116 from the optic signals 108. Thus, beam 116a is produced from a signal carried by fiber 112a, beam 116d is produced from a signal carried by fiber 112d, etc.

A first MEMS tilt mirror array 118, also referred to as an input array, is positioned in alignment with the lens array 114 so that each mirror element 12 (FIG. 1) will receive a beam 116. The mirror elements are tilted, in a manner discussed in application Ser. No. 09/415,178, to reflect the beams 116 to a second or output MEMS mirror array 122 positioned in optical communication with MEMS array 118. Depending on the tilt angle for each mirror element in the input MEMS array 118, the reflected signals can be selectively directed to specific mirror elements in the output MEMS array 122. To illustrate this principle, beam 116a is shown generating reflection beams 120a and 120a' and beam 116d is shown generating reflection beams 120d and 120d'. These beams are received by mirror elements in the output MEMS array 122 and are directed as beams 124 to an output lens array 126. An output fiber array 128 is aligned with the lens array 126 to receive and output optical signals 129. Thus, lens array 126 couples beams 124 into the output fiber array 128.

The crossconnect device 100 contains a 1-to-1 mapping of each output fiber to a mirror in the output mirror array. This is required with single mode fibers because of the small numerical aperture which necessitates coaxial alignment of the input and output beams with the fiber axes to achieve low power loss. The crossconnect of FIG. 2 allows for adequate spacing of the fiber and mirror arrays to limit the required mirror angle excursions.

A typical spacing dimension which will result in reduced diffraction losses is between 50–100 mm. If the mirror, lens and fiber arrays are coplanar, i.e. input fiber array 112, input lens 114 and output mirror array 122 are coplanar with each other, and output fiber array 128, output lens array 126 and input mirror array 118 are coplanar with each other, thus two similar monolithic blocks may be formed. Assembly of the crossconnect will then only require one six-axis alignment.

Another crossconnect configuration 200 in accordance with the invention is illustrated in FIG. 3. Like the crossconnect 100 of FIG. 2, crossconnect 200 contains an array of input lenses 214, and an array of output lenses 226 which communicate optical signals through an input fiber array 212 and an output fiber array 228, respectively. Input and output MEMS mirror arrays 218 and 222 are spaced apart from lens arrays 214, 226 for directing optical signals between the input fiber array and output fiber array. Unlike crossconnect 100, the device in FIG. 3 has the MEMS mirror arrays and lens arrays positioned on opposite sides of the crossconnect fabric, which allows for ease in construction. In particular, the mirror arrays can be monolithically integrated on a first common substrate and the lens arrays and fiber arrays monolithically integrated on a second common substrate. To provide for signal routing between the MEMS mirror arrays, the lens arrays 214, 226 are formed on a common substrate and spaced apart from each other so that a reflective element 230 can be disposed therebetween. Reflective element 230 may be a separate plane mirror or, preferably, a reflective coating material (e.g. gold) deposited on the lens substrate and positioned for communicating optical signals between mirror array 218 and mirror array 222. Once the lens arrays are in place, crossconnect 200 requires a single six-axis adjustment of the coplanar mirror arrays.

Figure 4:
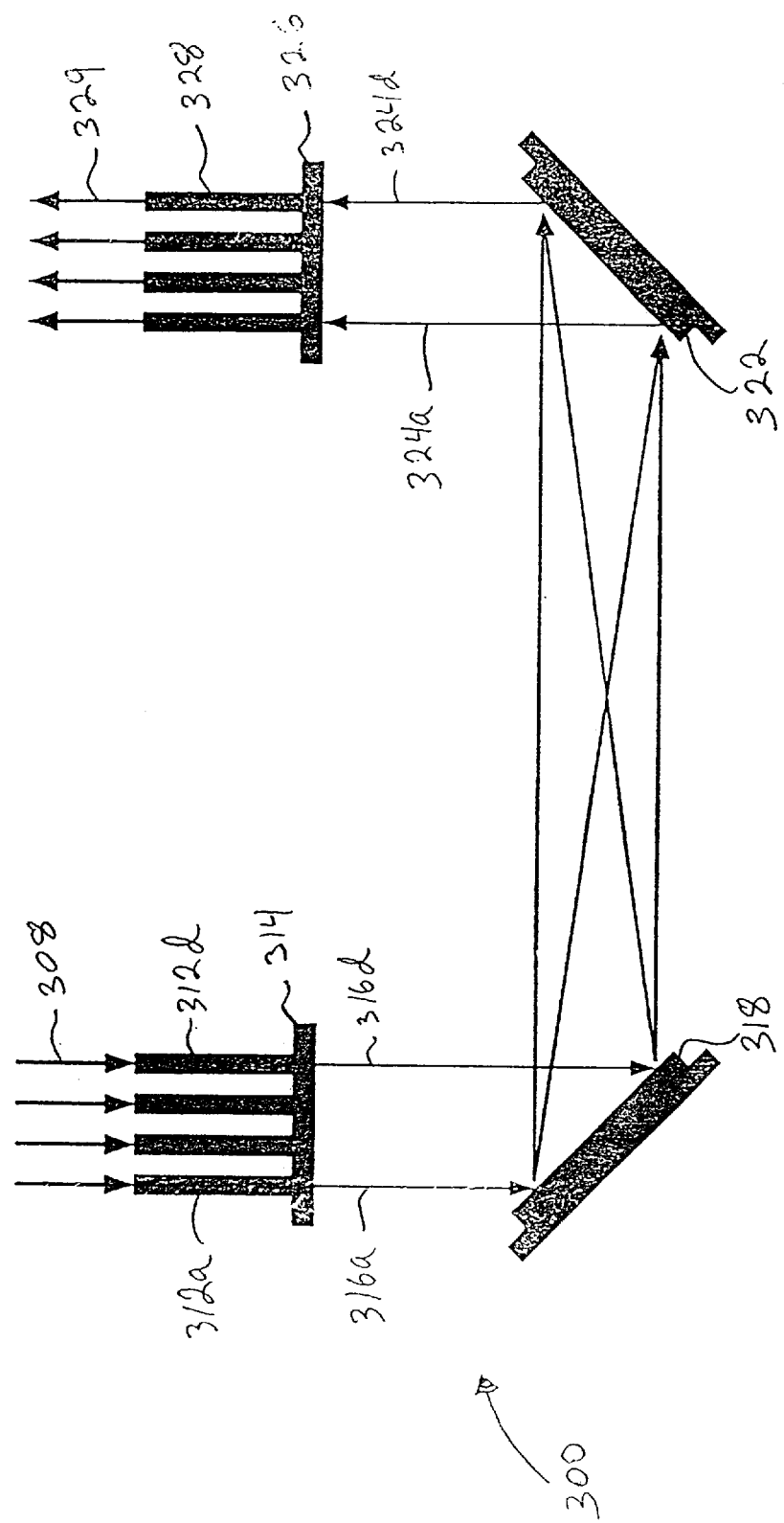
FIG. 4 is a schematic representation of yet another embodiment of the optical crossconnect of FIG. 2.

Turning now to FIG. 4, a variation of the crossconnect of FIG. 3 is shown as crossconnect 300. A primary difference from the embodiment of FIG. 3 is the removal of reflective element 230. As shown, mirror arrays 318 and 322 are angled relative to the substrate planes containing lens arrays 314 and 326 so that the optical signals can be communicated directly between the mirror arrays. In this embodiment, the maximum distance between each fiber array (e.g., array 312) and its opposing mirror array (e.g., array 318) can be small. This is an important design consideration, especially if the pointing accuracy of the fiber array is poor. The mirror elements in the mirror arrays can be used not only to adjust the switch connects (e.g., a routing function) but also to compensate for imperfections in the fiber array.

Figure 5:
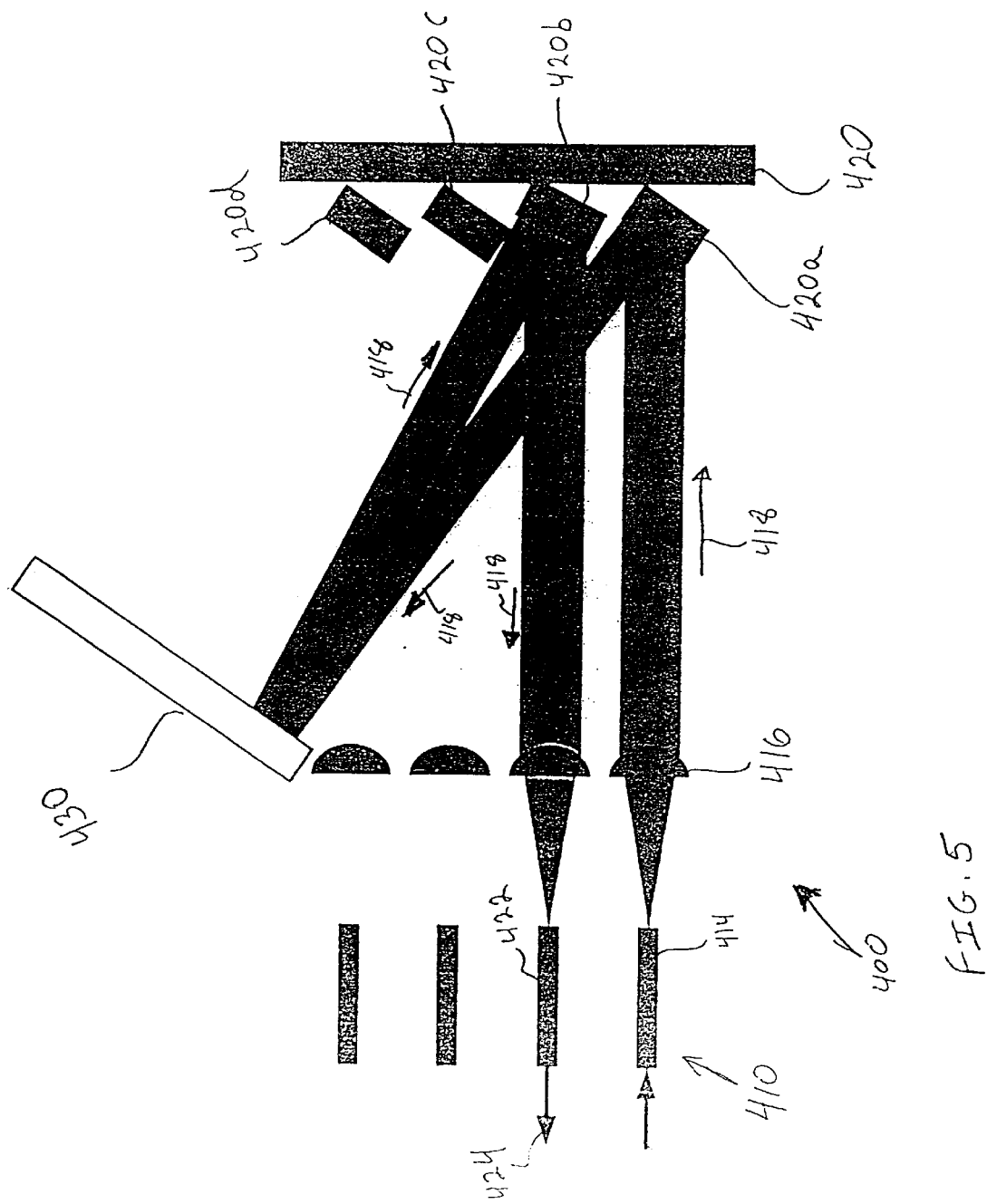
FIG. 5 is a schematic representation of a "folded" optical crossconnect in accordance with still another embodiment of the present invention.

FIG. 5 depicts another crossconnect 400 which employs a plane mirror 430 in an offset configuration relative to a single MEMS mirror array 420. In this further embodiment, a single fiber array 410, single lens array 416 and single MEMS mirror array 420 are used in a "folded" crossconnect arrangement. The single fiber array functions as a combined input/output array. An input signal 412 is provided to lens array 416 by fiber 414 for imaging on a mirror element 420a. The beam is then reflected to plane mirror 430 and reflected back to mirror element 420b for output through lens array 416 to output fiber 422. It should be noted that in this configuration, there is no distinction between input and output ports. Thus, with a 32×32 mirror array with one port unused, the crossconnect can be used as a 1×1023 switch, an array of 341 1×2 switches, or a 512×512 optical crossconnect. Other variations of course exist, as do other mixtures of crossconnect components (e.g. two 1×128 switches, sixty-four 2×2 switches and one 256×256 switches may be used with a 32×32 mirror array).

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An optical crossconnect device for directing optical signals received from a plurality of input optic fibers to a plurality of output optic fibers, said plurality of input fibers and said plurality of output fibers forming an array of optic fibers, comprising:

an array of lenses positioned for receiving the optical signals from the plurality of input optic fibers and for directing the optical signals;

a MEMS mirror array having a plurality of mirror elements, with each mirror element having a rotational axis about which each said mirror element is selectively operably tiltable, said mirror array being positioned for receiving optical signals directed by said array of lenses and for reflecting the directed optical signals to the plurality of output optic fibers; and a reflector element disposed in optical communication with said MEMS mirror array for receiving optical signals from said MEMS mirror array and for reflecting the received optical signals back to said MEMS mirror array, said reflected optical signals being redirected by said MEMS mirror array back to said array of lenses for receipt by the array of optic fibers.

2. The device of claim 1, wherein said each rotational axis comprises a first rotational axis and a second rotational axis and wherein said each mirror element is operatively tiltable relative to said first and second axes.

3. The device of claim 1, wherein said array of lenses comprises an input array of lenses and an output array of lenses which are coplanar with each other.

4. An optical crossconnect device for directing optical signals received from a plurality of input optic fibers to a plurality of output optic fibers, comprising:

an input array of lenses positioned for receiving the optical signals from the plurality of input optic fibers;

an output array of lenses positioned for directing optical signals to the plurality of output optic fibers, said input and output arrays of lenses being distally displaced from each other to define an area therebetween;

a MEMS input mirror array and a MEMS output mirror array, each said array having a plurality of mirror elements, with each mirror element having a rotational axis about which each said mirror element is selectively operably tiltable; and reflecting element disposed in said area between said input and output arrays of lenses, for receiving optical signals from said input mirror array and for directing optical signals to said output mirror array, said input mirror array being positioned for receiving optical signals directed by said input array of lenses and for reflecting the directed optical signals to said reflecting element, said output mirror array being disposed in optical communication with said input mirror array for receiving reflected optical signals from said reflecting element and for directing the received, reflected optical signals to the plurality of output optic fibers.

5. The device of claim 4, wherein said each rotational axis comprises a first rotational axis and a second rotational axis and wherein said each mirror element is operatively tiltable relative to said first and second axes.

6. The device of claim 4, wherein said input array of lenses is coplanar with said output array of lenses.

7. The device of claim 4, wherein said input and output arrays of lenses are formed on a common substrate.

* * * * *